United States Patent [19]

Armitage

[11] Patent Number: 5,136,551
[45] Date of Patent: Aug. 4, 1992

[54] SYSTEM FOR EVALUATION OF VELOCITIES OF ACOUSTICAL ENERGY OF SEDIMENTARY ROCKS

[76] Inventor: Kenneth R. L. Armitage, Bec, Bruniquel, 82800, France

[21] Appl. No.: 744,071

[22] Filed: Aug. 12, 1991

Related U.S. Application Data

[63] Continuation-in-part of Ser. No. 498,338, Mar. 23, 1990, abandoned.

[30] Foreign Application Priority Data

Mar. 23, 1989 [GB] United Kingdom ............... 89-06867

[51] Int. Cl.⁵ ........................... G01V 1/00; G01V 1/30
[52] U.S. Cl. ....................................... 367/38; 367/59; 364/421
[58] Field of Search ....................... 367/38, 59, 73, 25; 364/421

[56] References Cited

U.S. PATENT DOCUMENTS

| | | | |
|---|---|---|---|
| 4,373,197 | 2/1983 | Gassaway et al. | 367/36 |
| 4,562,558 | 12/1985 | Ostrander | 367/68 |
| 4,571,710 | 2/1986 | Neidell et al. | 367/38 |
| 4,692,910 | 9/1987 | Sondergeld et al. | 367/75 |
| 4,821,242 | 4/1989 | Hennington | 367/53 |

OTHER PUBLICATIONS

Bulat et al., "Uplift determination from interval velocity studies, UK Southern N. Sea," Petroleum Geology of NW Europe, pp. 293-305, 1987.
Wyllie et al., "Elastic Wave Velocities in Heterogeneous & Porous Media," Geophysics, vol. 21, #1, Jan. 1956, pp. 41-70.
Gardner et al., "Formation Velocity & Density—The diagnostic basics for Stratigraphic Traps," Geophysics, vol. 39, #6, Dec. 1974.
Brown, G., "Interval Velocity Studies in the Southern North Sea," GECO Exploration Services article.
Feder, A. F., "Integrated interpretation for exploration," Oil & Gas Journal, May 5, 1986, pp. 180-187.
Marsden, D., "I. Layer Cake depth Conversion," Geophysics: The Leading Edge of Exploration, Jan. 1989, pp. 10-14.
Ade et al., "F-Test, Isochron & Seismic Facies Analysis for Isopach Summation Depth Conversion," Singapore Seismic Stratigraphy Section, May 13, 1983.
Carter, M. D., "II. Depth Conversion Using Normalized Interval Velocities," Geophysics; The Leading Edge, Jan. 1989, pp. 15-16.

Primary Examiner—Ian J. Lobo
Attorney, Agent, or Firm—Harrison & Egbert

[57] ABSTRACT

An improved comprehensive system for definition of velocities of acoustic energy of sedimentary rocks is provided. First, geophysical exploration data available in the prior art is collected and organized to be defined as sequences and to define velocity behavior within sequences, and used to obtain consistently reasonable levels of accuracy of velocity distributions known by those skilled in the art. The present invention is particularly attentive to seismic sequence definition and to sequence compaction behavior. Secondly, in accordance with the present invention, means and methods not heretofore known in the art are used to sample well, seismic and other sources of data, on an individual basis, to define to what extent normal compaction behavior and velocities, as previously determined, may have been locally altered by other factors. Improved techniques to recognize several factors capable of causing abnormal post depositional behavior both at points of velocity control and elsewhere in areas of hydrocarbon prospecting interest, are intrinsic to the invention, and are important features thereof.

6 Claims, 12 Drawing Sheets

| | | DEFINED AS | 'CONVENTIONAL' METHOD | BECVEM METHOD |
|---|---|---|---|---|
| 1. | Seismic wells ties- statics, shift, migration for uniform/non-uniform dips, errors, TV correction, computation accuracy, anisotrophy raypath, wave shape | Spatial velocity variations | Fair/good | Fair/good |
| 2. | Separation of seismically discernable sequences defined at discrete well or seismic locations | Vertical lithological variations | Fair | Good |
| 3. | Velocity/depth behaviour of a sequence | Vertical velocity variations | Poor | Good |
| 4. | Seismic time definition of relative thickness/elevation changes between discrete locations of definition | Lateral velocity variations | Fair/good | Fair/good |
| 5. | Lateral changes in lithology (- 7 below), and errors (1 - 4), and RVV (- 6 below) | Preliminary velocity variations | End result | Stage |
| 6. | Discernible evidence per sequence from seismic, wells, gravity, magnetic, that a velocity anomoly of estimatable magnitude is likely to be present in a certain place (Post depositional) | Residual velocity variations | Poor (essentially not used) | Fair/good |
| 7. | Physical change in a sequence too small or too gradual to permit separate mapping (Depositional) | Lateral lithological variations | Poor/fair | Fair/good |

FIG.1

| | | DEFINED AS | 'CONVENTIONAL' METHOD | BECVEM METHOD |
|---|---|---|---|---|
| 1. | Seismic wells ties- statics, shift, migration for uniform/non-uniform dips, errors, T.V. correction, computation accuracy, anisotrophy raypath, wave shape | Spatial velocity variations | Fair/good | Fair/good |
| 2. | Separation of seismically discernable sequences defined at discrete well or seismic locations | Vertical lithological variations | Fair | Good |
| 3. | Velocity/depth behaviour of a sequence | Vertical velocity variations | Poor | Good |
| 4. | Seismic time definition of relative thickness/elevation changes between discrete locations of definition | Lateral velocity variations | Fair/good | Fair/good |
| 5. | Lateral changes in lithology ( - 7 below), and errors (1 - 4), and RVV ( - 6 below) | Preliminary velocity variations | End result | Stage |
| 6. | Discernible evidence per sequence from seismic, wells, gravity, magnetic, that a velocity anomoly of estimatable magnitude is likely to be present in a certain place (Post depositional) | Residual velocity variations | Poor (essentially not used) | Fair/good |
| 7. | Physical change in a sequence too small or too gradual to permit separate mapping (Depositional) | Lateral lithological variations | Poor/fair | Fair/good |

Breakdown of the Interpretation Steps for each Post Depositional Factor

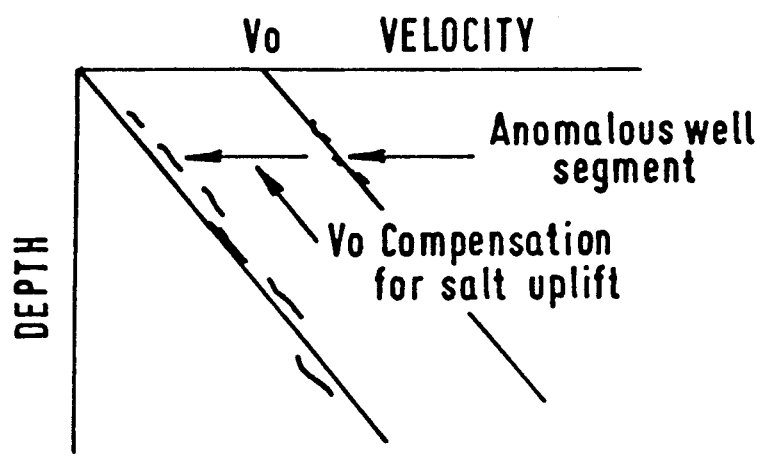
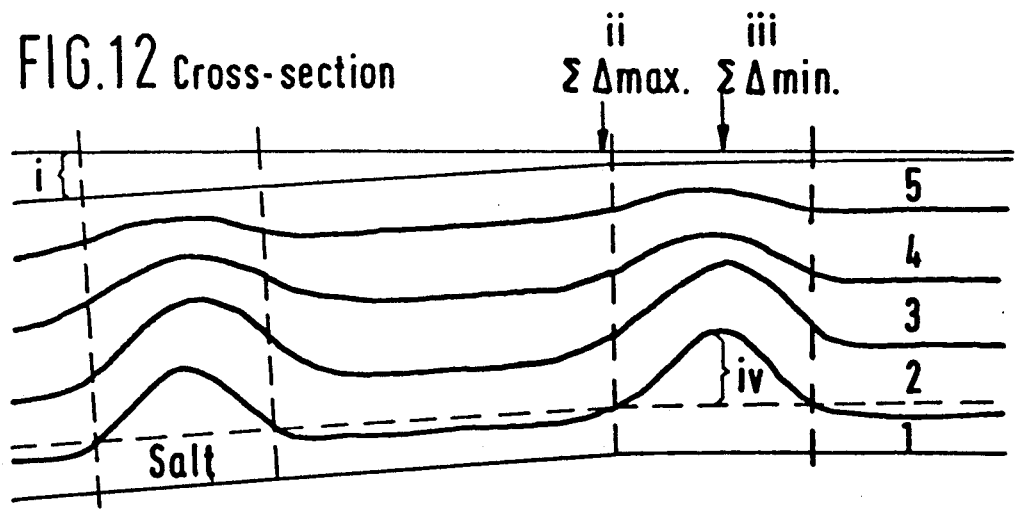

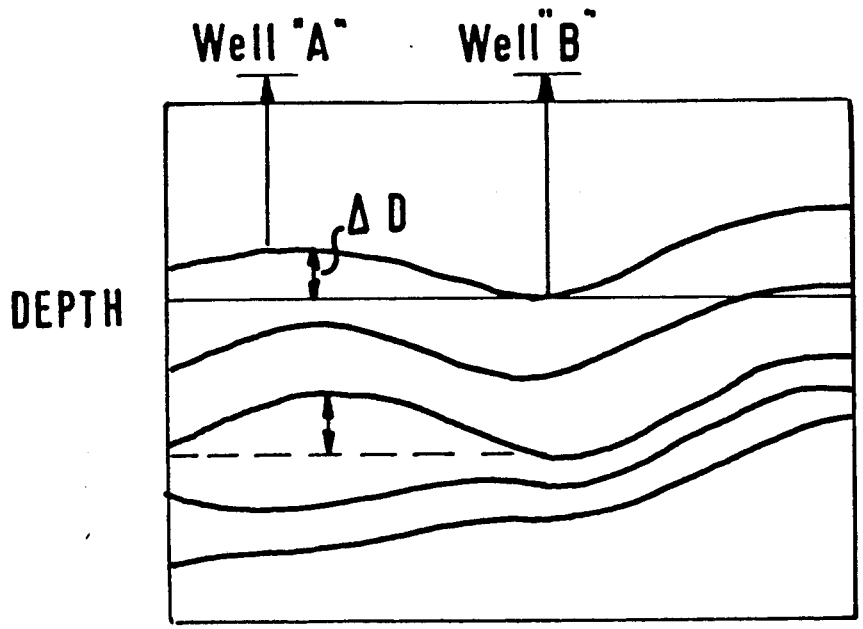
FIG.13 (Cross section)
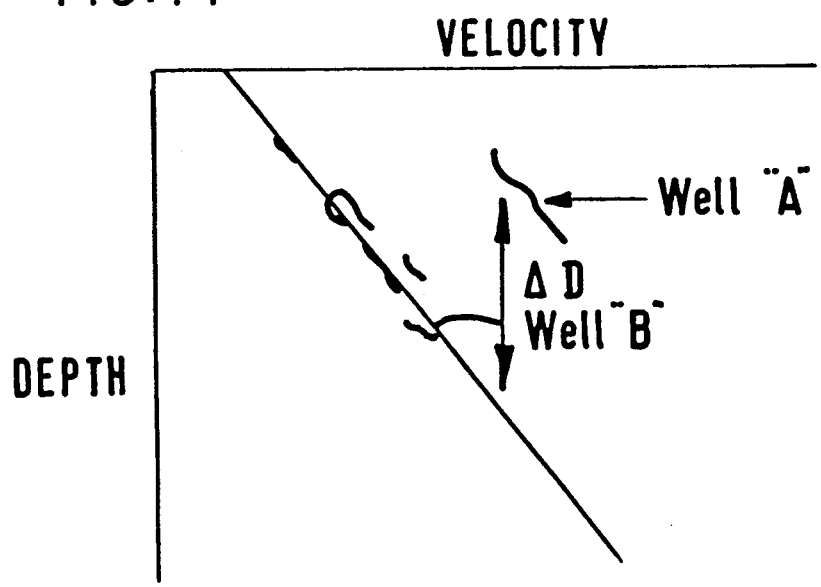
FIG.14

MAP

Velocity anomaly at location of Well "X"

VELOCITY

Anomalous Segment Well "X"

Move this in and observe effect on contoured Vo map

DEPTH

Tectonics

C = Compression

E = Extension

SYSTEM FOR EVALUATION OF VELOCITIES OF ACOUSTICAL ENERGY OF SEDIMENTARY ROCKS

RELATED APPLICATIONS

The application is a continuation-in-part of pending U.S. application Ser. No. 498,338 filed Mar. 23, 1990, now abandoned, which in turn claimed priority based upon UK Application Serial No. 89 06867.0 filed Mar. 23, 1989.

BACKGROUND OF THE INVENTION

This invention relates to geophysical prospecting and exploration, and more particularly relates to methods and means for defining velocities of acoustic energy of sedimentary rocks and determining the causal effects thereof attributable to lithology and post depositional processes.

It is well known in the prior art that any investment by the oil industry in exploration or development within a complex geological environment should be accurately risked to assess the chances of success or failure. Since the majority of the oil industry's prospecting in such environments results in failure and waste, it has not heretofore been known how to systematically and reproducibly improve hydrocarbon prospecting methodology.

Probably a significant proportion of this limitation of the prior art is attributable to depth conversion deficiencies. As is well known in the art and described by Al Chalabi in "Velocity Determination from Seismic Reflection Data" published in Applied Science, vol. 1, pp. 1-68, in 1979, depth conversion is the process of converting time surfaces, defined by seismic data and preferably well control data, to depth surfaces. Velocities used in this conversion are normally accurate only at well control points. Between well control points velocities are derived from the seismic stacking process in which a correction for normal move-out allows an estimate of local velocities to be made. The accuracy of such velocities may locally be of the order of 80% to 100%, and variations with a particular hydrocarbon prospect are likely to be no less than 5%. Such accuracy may be inadequate for drilling purposes, i.e., to locate economically developable hydrocarbons, if either a drilling discovery is subsequently proved to be different from that prognosed in size or distribution, or if a drilling failure, because of defective depth conversion, is actually adjacent a subsequent discovery.

This limitation of the prior art may also be attributable to a failure to correctly assess local presence of sources or seal or reservoir. Seismic stratigraphic studies piece together various items of physical evidence, including velocities of seismic sequences. Subtleties of variation in evidence may be all that is available to determine the difference between, for example, a low energy shale with source potential and a medium energy coarser clastic with no source potential. Thus, effective velocity interpretations should be a part of a seismic stratigraphic analysis which examines such subtleties of evidence. See volume 2 of Tucker's text *Applied Geophysics for Exploration* for a general discussion of this technology.

While the attempts to advance the prior art have had only limited success, the underlying lithologies from which a plethora of geophysical data is accumulated at great expense during and pursuant to prospecting and the like, physically exists. Indeed, conventional exploration practice can offer an adequate understanding of these factors and their concomitant effects upon velocity distribution, which are apparent in simple basins. In complex multilayered basins, however, especially where stress directions have generally and locally changed with time, the conventional practice often fails to adequately understand and describe these factors.

Even if some of these factors are clear when viewed in isolation, if such were possible, it should be apparent that they are apt to be obscured when associated with each other. Accordingly, what would be useful is a seismic stratigraphic process capable of rigorously isolating, understanding and defining each of these factors, and thereby preventing compounding of the underlying physical reasons which, in the aggregate, cause the lateral and vertical variations in a basin's overburden velocity field.

It is, of course, well within the skill and experience of those skilled in the art to identify and resolve individual problems in some geophysical environments. Data quality is regularly enhanced by on-going improvements in drilling accuracy, advanced processing of improved two-dimensional seismic data, acquisition of closely-spaced seismic lines processed heuristically as three-dimensional data, and generation of depth seismic displays created before and after stack. Nevertheless, even though seismic resolution and signal-to-noise ratios improve at the hands of those skilled in the art, a significant proportion of wells drilled are still failures because of locally miscalculated velocity distribution. Clearly, these improvements are limited to time data, and do not reach velocity distribution. Indeed, as should be apparent to those skilled in the art, even in productive basins which have an increase with time of well control and high quality seismic data, a proportional increase in drilling accuracy has not commonly been realized. Unfortunately, there are still geological surprises under these presumably well defined circumstances.

The rigorous attention to detail for defining sequence related velocities from well and seismic data discussed by Carter in the paper entitled "Depth Conversion Using Normalized Interval Velocities" published in the January 1989 issue of Geophysics TLE, and other recognized experts in the art, affords practitioners the opportunity to reduce the risks of drilling failures. However, since the seismic method intrinsically cannot produce 100% accurate velocity maps, it clearly cannot be the whole answer.

For instance, additional information has been sought related to compaction behavior. More particularly, Gardner et al. in the papers "Formation, Velocity and Density - the Diagnostic Basis for Stratigraphic Traps" published in Geophysics, vol. 39, no. 6, pp. 770-780, and "Elastic Wave Velocities in Heterogeneous and Porous Media" published in Geophysics, vol. 21, no. 1, pp. 41-70, has encouraged practitioners in the exploration field to attempt to remove the effects of burial from sequence velocity maps by normalization techniques. See Carter, "Depth Conversion Using Normalized Interval Velocities" published in Geophysics TLE, January 1989.

Rigorous attention to detail in analyzing well control of sequences pursuant to distinguishing between normal and abnormal behavior may significantly reduce drilling risks, but is nonetheless dependent upon the logic of the method applied. As is known in the art, a commonly applied method to determine compaction behavior is to plot sequence interval velocity at its midpoint depth, per well, and then to statistically interrogate the resulting scattergram to seek trends and exceptions thereto. This scattergram approach, however, inherently precludes insight into local subtle anomalies. For instance, for sequences on the order of four hundred feet thick and sampled every six inches, this conventional method reduces the data to merely one point. In addition, regression analysis performed on individual well midpoints may yield erroneous information about a sequence's compaction, which is contrary to a major trend exhibited by the individual wells.

Bulat and Stoker in their paper entitled "Uplift Determination from Interval Velocity Studies" published in Petroleum Geology of Northwest Europe, pp. 293-305 in 1987, demonstrate some of the limitations of the midpoint depth method. Their investigation into velocity distribution, using techniques well known in the prior art, examined inversion in the UK Gas Basin, and therefor necessarily grouped myriad factors together instead of isolating individual variables. Accordingly, the results were unsatisfactory because of contaminated compaction factors and the like. That is, it may be that the maps obtained were contaminated by 4! variations, i.e., twenty four potential variations, instead of merely being related to basin inversion as possibly intended by Bulat and Stoker. Stated differently, as many as twenty four factors should have been individually considered as contributing to the lithology of the basin, not just basin inversion. In their concluding remarks, the authors observe that their problems were due to the confounding effects of other geologic factors, presumably operating collectively in an obscure and unknown manner.

There have been various attempts to overcome the accuracy limitations inherent in seismic velocities. In U.S. Pat. No. 4,692,910, Sondergeld et al. disclose a method for determining lithological characteristics of an underground formation whereby compressional velocity and shear velocity are plotted against such seismic parameters as bulk velocity, porosity, fluid saturation. Velocity boundaries are determined for at least one formation material type. Thus, from the position of the data points relative to the velocity boundaries, lithological characteristics may be ascertained. But it should be clear to those skilled in the art that the Sondergeld method fails to allow for past depositional processes with their consequences upon lithology.

In U.S. Pat. No. 4,571,710, Neidell teaches a method for identifying zones of anomalous low subsurface velocity based upon seismic reflection arrival time data. Assuming no local lateral velocity variation, the method attempts to relate porosity and the possible presence of hydrocarbons to these zones. Other attempts have been made to improve the determination of local rock composition from seismic data. For instance, Gassaway et al., in U.S. Pat. No. 4,373,197, disclose an exploration system for enhancing the likelihood of predicting lithology of earth formations associated with deposits of ore, marker rock and economic minerals. the system purportedly provides for the accurate mapping of crustal earth formations via refractive seismic waves to identify structure, elastic parameters and lithology of strata whereby mineral deposits and the like may be located. For plots of compressional and shear waves, changes in sediment structure are indicated. There is no provision for defining velocity-depth relationships nor all of the post depositional causes of lithological change observed. Similarly, Ostrander, in U.S. Pat. No. 4,562,558, teaches a method for determining local lithology of gas-bearing strata using high-intensity amplitude events in seismic records. Changes in p-wave reflection coefficient as a function of angle of incidence indicate the lithology of the reflecting horizon and copying strata. However, while this analysis may be useful for identifying anomalies over short distances, it fails to identify possible causes of such anomalies.

Thus, heretofore unknown in the prior art is a method for predicting velocity variation changes based upon knowledge of subsurface geology. On the contrary, the emphasis in the prior art has been to attempt to predict geology based upon knowledge of velocity or magnetic fields.

Furthermore, there is also unknown in the prior art a methodology which focuses on the probable underlying cause or causes for modification of velocities in subsurface sedimentary rock formations.

Accordingly, these limitations and disadvantages of the prior art are overcome with the present invention, and improved means and techniques are provided which are especially useful for geophysical prospecting and exploration by systematically evaluating and analyzing the post depositional causes for velocity variations.

SUMMARY OF THE INVENTION

The present invention provides an improved comprehensive system for definition of velocities of acoustic energy of sedimentary rocks. First, geophysical exploration data available in the prior art is collected and organized to be defined as sequences and to define velocity behavior within sequences, and used to obtain consistently reasonable levels of accuracy of velocity distributions known by those skilled in the art. The present invention is particularly attentive to seismic sequence definition and to sequence compaction behavior. Secondly, in accordance with the present invention, means and methods not heretofore known in the art are used to sample well, seismic and other sources of data, on an individual basis, to define to what extent normal compaction behavior and velocities, as previously determined, may have been locally altered by other factors. Improved techniques to recognize several factors capable of causing abnormal post depositional behavior both at points of velocity control and elsewhere in areas of hydrocarbon prospecting interest, are intrinsic to the invention, and are important features thereof. As will be described in detail, it is a lack of consideration and analysis of these factors which has contributed substantially to the failure of those skilled in the art to successfully predict velocities in basins throughout the world.

Those skilled in the art competently accommodate knowledge of the various lithologies such as sands, shales, marls, limestones, chalks, salts, evaporates, etc. The general velocity behavior of each is adequately understood both in terms of consistent mineralogy, but changes in overburden, i.e., depth of burial, and also in terms of consistent overburden, but changes in mineralogy, e.g., sand/shale ratios.

If, for example, a shale behaves consistently over an area of interest in terms of its mineralogy etc, those skilled in the art could with some accuracy predict its velocity from its known depth, and vice versa. Where other factors modify this relationship, however, confusion develops, and a need is evident for a reliable and practical methodology. Such factors include variations during history causing present day depth of burial to be less than at some other time, variations in stress fields such that effective constraining pressure is or was once significantly higher at one place than another at the same depth, and variations in temperature and fluids. Accordingly, in accordance with the present invention, methods and means are provided to enable a detailed and comprehensive analysis to be made from measured thickness and other parameters of seismic sequences, whereby expectations derived from velocity control of well and/or seismic origin may be appropriately modified.

Short wave inversions, such as salt or shale diapirs, typically on the order of plus or minus one mile, may cause a sequence to have been uplifted by movement of a less dense mass below, which rises to reestablish equilibrium. In accordance with the present invention, a new process called SINVA is disclosed to enable understanding of this phenomena. Similarly, long wave inversion, such as basin inversion, typically on the order of plus or minus ten to fifteen miles, may occur during post depositional history and seismic expression may be insufficient to allow calculation of depths of maximum burial. For example, this may happen because of erosion due to uplift. In accordance with the present invention, a new process called BINVA is disclosed to enable understanding of this phenomena.

Compressional episodes during post depositional history may cause a reduction of distance between two hypothetical points deposited at a common age, by horizontal (or at least significantly non-vertical) compaction of pore space. In accordance with the present invention, a new process called CONVA is disclosed to enable understanding of this phenomena. As is generally known to those skilled in the art, variation in faulting, thermal episodes, thermal conductivity, and/or pore fluids may all lead to localized variances in pore space and velocity distribution. In accordance with the present invention, new processes called FANVA, TENVA, and PENVA are disclosed to enable a comprehensive understanding of these phenomena.

As should be appreciated by those skilled in the art, determination of sequence velocity distribution is inexact because it invariably cannot be exactly sampled. It should also be clear from the prior art that increased accuracy of sequence velocity distributions is not necessarily achieved merely by attempting to improve the accuracy of seismic velocities. Accuracy must be obtained separate from and in addition to seismic and stacking velocity constraints. This determination should, of course, be tailored to the particular requirements of a task. If additional accuracy is required, it may be achieved by methods which analyze the presence and degree of the hereinbefore described circumstances, all of which can locally distort velocity distribution by estimable amount. These circumstances of post depositional mechanics make recognition of an inexact velocity distribution difficult unless they are integrated into the analysis. In accordance with the present invention, methods and means heretofore unknown in the prior art are provided whereby the individual effect of each phenomenon is systematically filtered out, thereby leaving in the equation fewer possible variables to study and understand.

It is an object of the present invention to provide a method for determining sequences and their current compaction and velocity behavior.

It is also an object of the present invention to provide a method for determining post depositional processes relevant to particular sedimentary rocks being studied.

It is a further object of the present invention to provide a method for determining the quantitative effect of each of a plurality of relevant post depositional processes upon velocity distribution in an area of study.

It is a feature and advantage of the present invention that once all of the post depositional processes have been ascertained and estimated, the actual deposits contained in a particular area may be estimated with a reliability heretofore unknown in the prior art. It is accordingly an object of the present invention to provide an improved method for determining hydrocarbon deposits in an area of study.

It is a further object of the present invention to provide a method for systematically and comprehensively studying the lithology of an area through its related velocity distribution, whereby its functional relationship with such phenomena as variations in mineral percentage, grain size and types, cements, and the like, is understood.

In accordance with the present invention, a comprehensive methodology is provided for significantly improving the productivity of oil and gas exploration. Named BECVEM, an acronym for BEC Exploration Consultants Velocity Evaluation Method, this preferred methodology provides practitioners in the art with a surprisingly effective exploration tool. In a preferred embodiment of the present invention, as will be described in detail, BECVEM's logical steps and stages have been incorporated into a collection of computer programs.

It is an object of the present invention to provide a method for automating oil and gas prospecting and exploration using prevalent computer technology and the like whereby those skilled in the art may better understand the lithology of subsurface formations and, consequently, reliably predict the deposits contained therein.

It is an object and feature of the present invention that a method is provided to enable the mapping of the contours of a particular area notwithstanding the myriad interrelationships among the several post depositional factors thereof. Indeed, the prior art's ability to adequately map such complex areas has been handicapped by a lack of understanding of the consequences of these various phenomena upon lithology and velocity distribution. Considering only seven of these several factors (7!=5040) which commonly combine to render accurate mapping impracticable, produce more than five thousand possibilities.

It is also an object and feature of the present invention that a method is provided to enable those skilled in the art to analyze the effects of post depositional processes upon the porosity of subsurface rock formations.

It is an object of the present invention to enrich the prior art with an industry standard allowing easier communication on technical matters between parties.

It is another object of the present invention to provide those skilled in the art with improved techniques and methods which may be ported to virtually any basin throughout the world.

It is another object of the present invention to provide for accuracy and reproducibility in Unitization and Equity work whereby hydrocarbon resources may be equitably apportioned among the parties without extensive debate.

It is another object of the present invention to provide a data based, paperless, automated means and method for performing geophysical prospecting.

It is another object of the present invention to allow location of some hydrocarbon accumulations which are currently invisible to the art.

It is another object of the present invention to provide a data based, paperless, automated means and method for performing geophysical prospecting according to standardized company practices and procedures.

It is another object of the present invention to provide an automated system for definition of velocities of acoustic energy of sedimentary rocks which can be readily integrated with existing computer system designed for interactive interpretation of prospecting data.

It is another object of the present invention to provide a means and method to reduce the number of wells prerequisite to locating and producing hydrocarbons in an area.

It is another object of the present invention to provide a means and method for increasing reservoir and overburden knowledge with respect to mitigating drilling hazards due to porosity distribution and the like.

It is a specific object of the present invention to provide, in an environment encompassing sedimentary rocks disposed in situ in subsurface sequences, from which conventional well log data, including sonic data, has been obtained downhole, and from which seismic time sections and velocity spectra at discrete locations have been conventionally obtained, a method of evaluating velocity distributions and interpreting the depositional and post depositional causes therefor, comprising: selecting lithological units from said seismic sequences and well log data to provide interval velocities therefor; inverting said sonic well log data to obtain velocities therefor; plotting velocity versus depth for said well sonic data; determining compaction factor by calculating the mean slope of all individual sonic data segments; determining preliminary normalized interval velocity with constant average compaction factor by calculating an average of the slopes for all of said segments for each well segment penetrating each said sequence; mapping compaction variation per sequence to determine the affect of lateral compaction variation upon velocity distribution; ascertaining functional relationships between a plurality of said post deposition physical processes and the velocity distribution depicted in said maps and said plots, by classifying the characteristics of said processes against the response of each of said sequences thereto; generating a sequence velocity correction surface for each said process showing said relationship; and removing said sequence velocity correction surface from said maps and said plots.

These and other objects and features of the present invention will become apparent from the following detailed description, wherein reference is made to the figures in the accompanying drawings.

IN THE DRAWINGS

FIG. 1 depicts the steps comprising the method embodying the present invention.

FIG. 11 is a plot of velocity vs. depth for one sequence depicting correction to an inverted well.

FIG. 12 is a cross section of distance vs. depth for two inversions showing different amounts of post movement deposition.

FIG. 13 is a cross section of distance vs. depth indicating sequence thick associated with an anticline suggesting basin inversion.

FIG. 14 is a plot of velocity vs. depth for the two wells depicted in FIG. 13, with well "A" exhibiting characteristics of basin inversion.

DETAILED DESCRIPTION

Part I

Figure 2:
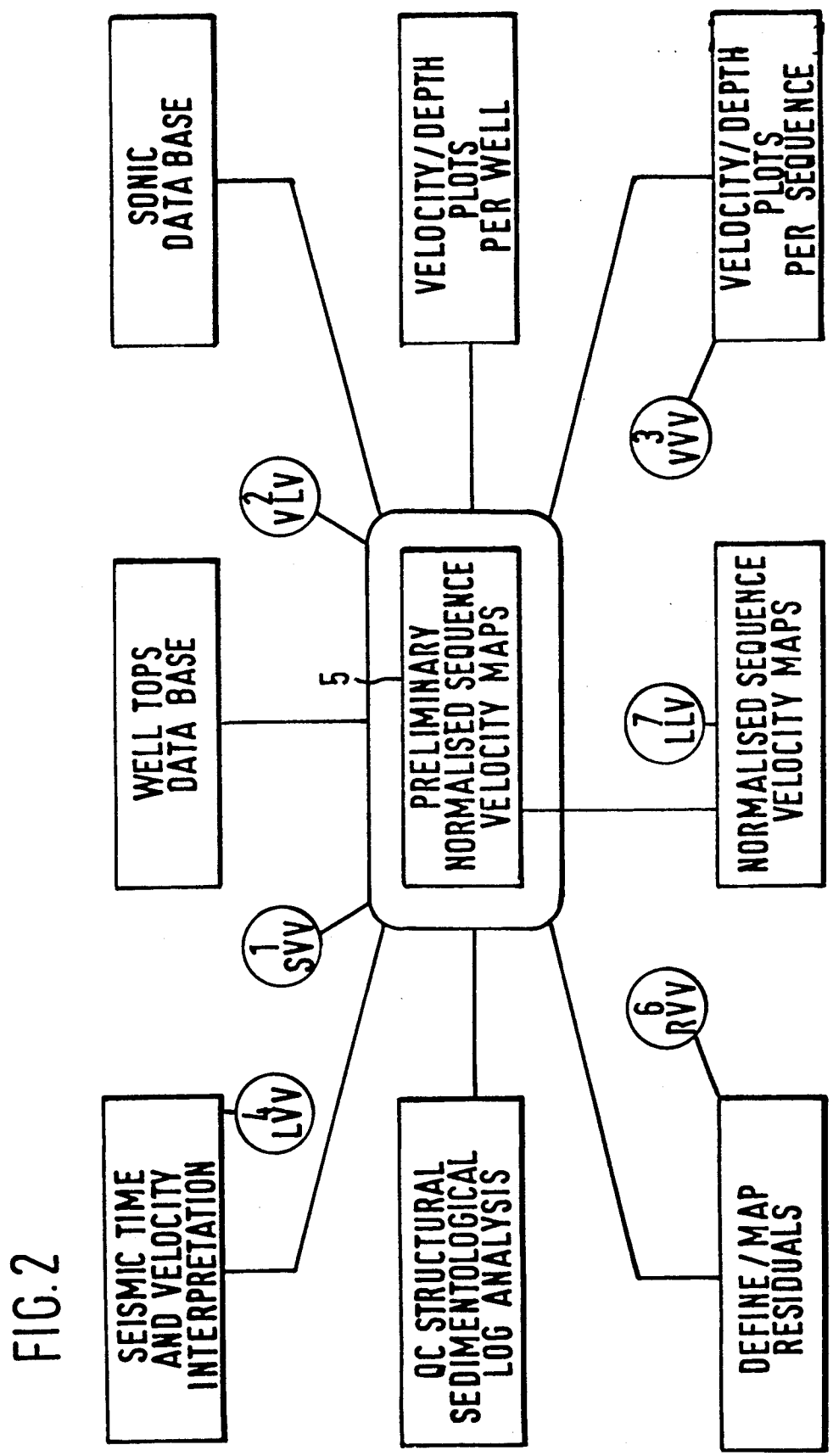
FIG. 2 is a flow chart depicting the flow of seismic and well data through the interpretive embodying the present invention.

As will be described in detail, the present invention provides a unique comprehensive system for defining the velocities of acoustical energy of sedimentary rocks. An elucidation of certain important concepts and terms will be defined to clarify the detailed description of the present invention herein.

Lithological units are intervals of rocks, generally of layered sedimentary type, which, each in a relatively continuous lateral and vertical sense, share similar or slowly varying physical and chemical characteristics. The term is used to focus on features on a macroscopic rather than a microscopic scale. General classification of such lithological units is by reference to mineral assemblages and rock matrix or cement. The deposition of a lithological unit may either continue directly after, or be terminated by, a period of non-deposition.

Seismic sequences are intervals of seismic data bounded at top and base by unconformities or their correlative conformities, and containing generically related sediments (see Vail et al. *American Association of Petroleum Geologists* Memoir No. 26). These intervals typically contain insufficient evidence to permit further subdivision into two or more seismic sequences of clearly different rock types, as defined by local well data or seismic stratigraphic studies. The unconformable nature of the upper and lower boundaries indicates the existence of evidence of periods of erosion or non-deposition between each seismic sequence. Rock types of adjacent seismic sequences may be similar or different.

Post-depositional physical processes are those various phenomena and concomitant circumstances which have occurred after deposition and initial burial of sediments, with the effect of causing physical change to the sediment, commonly by combinations of variations of pressure, temperature, and fluid, over time. Normal post-depositional physical processes include burial by subsidence and covering with more recent sediments, with associated increasing temperature and hydrostatic pressure. By contrast, abnormal post-depositional physical processes include introduction of significantly non-vertical or slanted maximum stresses for some period(s) of time, causing the current placement of sediment at lower confining pressures or temperatures than previously.

Compaction factor represents the relationships established between the increasing depth of burial of a particular rock type, or lithological unit, and change in its pore space or density, where pore space change for that rock type can also be related to change in velocity of acoustic energy. These relationships may be measured in a laboratory or taken from published data. For most lithological units studied over depth ranges commonly encountered in seismic geophysical exploration interpretations, the assumption of a linear or substantially linear relationship of increasing velocity with increasing depth is satisfactory.

An inversion of sedimentary rocks corresponds to lifting them up to a position in space above depths at which they were anteriorly buried. This causes sedimentary rocks to have physical attributes out of equilibrium with neighboring rocks at that depth, and causes complications in depth conversion and porosity and velocity evaluations. Large scale events like mountain building episodes or the squeezing of basin fill commonly result in inversion of hundreds of cubic kilometers of sediments. Other types of inversion also exist which affect sediments on a smaller scale where up to about a hundred cubic kilometers volume may have been inverted to a measurable extent. These are short wave inversions, relative to oil exploration control consisting of seismic and well-log data. Short wave inversions are both density-driven by underlying less dense sediments, such as salts or over-pressured and unconsolidated shales, and strain-driven by a localized stress mechanism responding for example to a heavy non-vertical application of stress.

A tectonic episode is an episode which occurs as a result of an extensive nearby plate movement over several millions of years causing regional stresses and strains, thereby accelerating rates of erosion and inversion, or development of basins. Since these stresses are transmitted with time through typically inhomogeneous rocks, they become modified and locally distorted, and, thus, difficult to classify as part of an overall process. The driving force effecting an often complex local sedimentation and series of local post-depositional physical processes is frequently a major regional activity which usually has a less complex explanation, e.g., Africa "bumping" into Europe.

The present invention defines for several important post-depositional physical processes, per each interpreted seismic sequence, a value at each point of data. This value describes the way in which that process affects that sequence at that data point. Collectively the data points constitute a mapping of the process' affects in ways that allow estimation of the probable amount of the sequence velocity change for which that process is responsible. These constitute the "characteristics" of such processes. For example, by using the "SINVA" methodology under the present invention, may be measured and developed distributions for each affected sequence which estimate the characteristics of a salt inversion process upon overlying layers of sedimentary rocks.

Thus, the present invention provides, for each seismic sequence, a distribution which maps the manner in which a particular process affects each layer in a sedimentary rock formation. To validate the ascertained characteristics of this process, the underlying data set indicating how much the seismic sequence velocity in a mapped area has been affected should preferably be examined by a geologist or geophysicist. Once accepted as valid, either as is or by applying a scaling factor, the data set is preferably used as a sequence velocity correction surface to correct the effects of a particular process on the seismic sequence.

It will become clear to those skilled in the art that the present invention shows how the distribution of different geological parameters or estimation of the effect of geological process may be viewed for each interpreted seismic sequence or lithological unit. Viewing may be accomplished by mapping that parameter such as the thickness or depth over an area, or by plotting one parameter against another parameter, or, indeed, by comparing and contrasting maps and cross plots of different parameters.

Since there is conventionally superior data available at points of well control as opposed to points remote from the well, it is necessary to develop, apply and test the various hypotheses which appear to govern the distributions as sampled. In accordance with the present invention, each mapped parameter or effect of a process is a quantifiable data set describing the characteristics of that parameter or process. Where comparison of data sets shows a quantifiable change in one is associated with a quantifiable change in one or more others, a functional relationship therebetween is established. For example, if the analysis of seismic sequences, as seen in well log data, shows a velocity which is related to depth, then interval velocity maps of that sequence will predictably show contours affected by depth variation as expressed in depth maps. As another example, if a seismic sequence has been locally inverted to be higher than it once was, and it is of a lithology showing a known compaction factor, then a map of the inversion suffered by that sequence will show a functional relationship to well velocity map for wells that themselves have been inverted.

If homogeneous widespread stress causes strain homogeneous widespread, then large basinal areas affected by extension or compression fail to account for rapid lateral sequence property change, e.g., velocity, porosity, density, imparted by non-diapiric post-depositional processes. Well failure rates, however, remain stable in excess of 75% (based upon UK Department of Energy statistics reported in 1989), in spite of improved seismic and well control. There is also increasing evidence that seismic rock properties do not significantly vary over short distances, e.g., 50–5,000 meters, because of tectonic changes therein. Indeed, indications are that a large proportion of offshore and several onshore basins contain hydrocarbon prospective sediments locally and irregularly modified by compression. This compression appears to have been imparted by transform faulting within a generally extensional environment as will be hereinafter described.

Harding and Lowell, in their paper "Structural Styles. Their Plate Tectonic Habitats and Hydrocarbon Traps in Petroleum Provinces" which was published in the *American Association of Petroleum Geologists Bulletin*, vol. 63, no. 7, 1979, define four basement-involved styles: wrench assemblage, compressional block, extensional block, and warps. Wrench fault assemblages are described as having both compressional and extensional features, or being dominated by either compressional or extensional features. Thus, each of these three substyles (side-by-side, convergent, and divergent wrenching) result from the configuration of laterally moving blocks, or from the orientation of the boundaries relative to regional plate motion, or both.

Furthermore, Pegrum discloses in his paper "The Extension of the Tornquist Zone in the Norwegian North Sea" published in the *Journal of the Geological Society of Great Britain*, 1984, and also in *Norsk Geologisk Tideskrift I*, 1984, that inversion tectonics are widespread in the northwest Europe and the adjacent continental shelf. In particular, several sedimentary basins show a cycle of fault-controlled subsidence under extension, followed by uplift, i.e., inversion, caused by compression. Pegrum states that "[R]egional extension abruptly ceased in the early Cretaceous with the northward drift of the Afro-Arabian Plate and its collision with the Eurasian Plate." In addition, Gibbs' publication in *Journal of the Geological Society*, vol. 141, 1984, entitled "Structural Evolution of Extensional Basin Margins," describes transform faults as being responsible for areas of local compression in an extensional environment.

Accordingly, to accumulate hydrocarbons in sediments a trapping mechanism is needed. Most such mechanisms appear to be provided by tectonics. The trapping environment of extension mixed with an episode or episodes of compression caused by transform movement, as herein described, is difficult to interpret. This mechanism causes, as a by-product, localized changes in sequence rock properties. The present invention recognizes this scenario and is accordingly designed to provide a methodology for effectively and reliably overcoming this and other long-standing problems in the art.

Data Assembly, Preparation and Quality Control

Data required to undertake a full application of the methodology as described below are:
  Accurately picked boundaries of discrete lithological sequences using sonic logs and other from wells, such as may be deemed appropriate.
  Accurately integrated sonic logs, check shot and datum corrected, and matched to seismic sections.
  Accurately picked and digitized seismic stratigraphic units from seismic time sections to match the previously picked lithologic units on well logs.
  Heat flow and fluid pressure information from well logs.
  A means of measuring or estimating the degree of sequence shortening or extension by 2 or 3-D palinspastic reconstruction, or by simple use of digitized sequence boundary lengths, less faults.
  Sequence related seismic velocity maps, as appropriate.

FIG. 1 is a detailed representation of the method structure embodying the concept of the present invention. FIG. 2 is a flow chart of the material handling. The detailed description of the preferred embodiment may be described in seven (7) steps.

1. Spatial Velocity Variations

A potential exists for velocity maps to be contaminated by variations such as:
  i) Vertical Corrections (well and seismic ties)
    (a) Lateral changes in boundary reflection (tuning—change in original data, etc.)
    (b) Deviated Wells
    (c) Seismic statics
  ii) Non Vertical Corrections (well and seismic ties)
    When overburden not flat lying/homogeneous. Where two dimensional migrations not perpendicular to all overburden dips. Use Raytrace Modeling/Migration overlays/Map Migration, etc.
  iii) Seismic Velocities
    NMO derived velocity data accuracy limited by:
      Reflection dip
      Acquisition error
      Wavelet shape
      Anisotrophy
      Spatial error
      Noise
      Wave propagation path
      Computation accuracy These may combine to cause anomalies or trends which are difficult to separate from real or even probable anomalies or trends.

2. Vertical Lithological Variation

Figure 4:
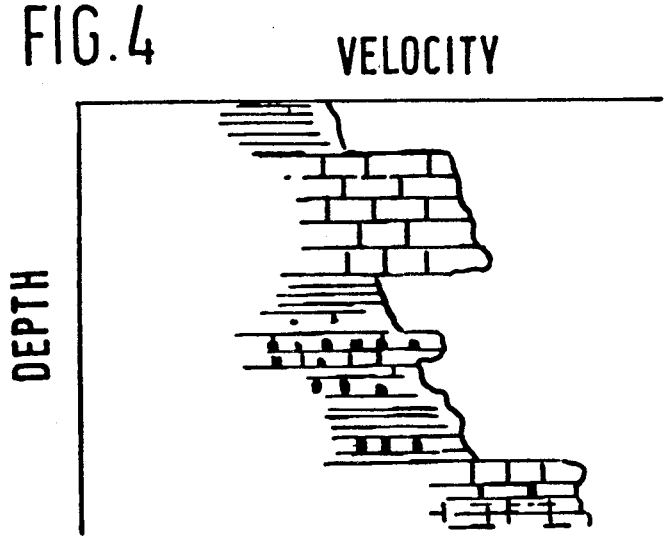
FIG. 4 is a plot of velocity vs. depth of one well depicting several sequences of different lithology.

Separation of seismically discernable sequences defined at discrete well and seismic locations. FIG. 4 depicts a plot of velocity versus depth of one well showing several sequences of different lithology. For each well, the sonic velocity is plotted against depth to aid sequence definition. Those sequences identified will be required to be mapped in time (to aid definition of LLV) and further studied, to define other variables (VW, RW, LLV).

Method Becvem

Establish well tops/times/temperature data base.
Establish calibrated sonic data base - sampled 1' to 5' (slight filtering?).
Establish plots per well +/-15 cm/1000'×1 cm/1000'/s showing tops listed in data base.
Review throughout evaluation area sonic detailed sequence boundaries - continuity - character correlation.
Review seismic continuity etc. Identify sequences not seen in wells. Combine adjacent sequences of similar velocity, lithology, depth behavior.
Reconfirm choice of sequence, and common datum level, for interpretation/mapping/depth conversion.
Recheck tops - times - ties.

3. Vertical Velocity Variations

For each chosen lithological unit, the sequence of well sonic logs, integrated, check shot corrected and expressed as velocity is displayed adjacent to cross plot with axes of velocity versus depth for wells in a chosen area. Definition of sequence compaction, velocity, depth, age behavior, response to normalization procedures, may be made.

Analysis to ascertain, by regression analyses, per well, sequence compaction. Definition of missing or repeated section (by faulting), may be readily made by comparision of log data and sequence thickness maps. Definition of plotted velocity/depth relationships at each control point are made and thus permit a comparison aerially of behavior with changes—identified as possible changes in modeled geology. If differences appear significant relative to the task at hand, consider seismic separation of sequences and consider lateral variation of compaction gradient in the mapping of velocities.

Figure 5:
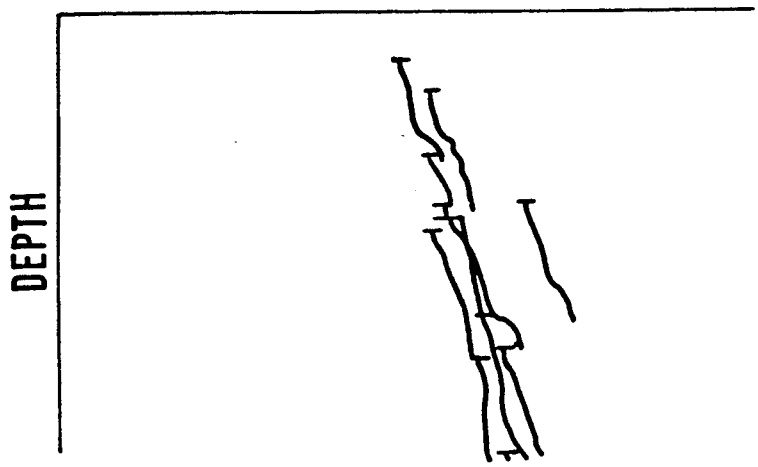
FIG. 5 is a plot of velocity vs. depth of nine wells and one sequence depicting general similarity of compaction behavior.

FIG. 5 depicts a plot of velocity versus depth of nine wells and one sequence showing general similarity of compaction factor. In addition to permitting later identification and removal of VVV's this interpretation process helps discern and define total elevation and thickness ranges occupied by the sequence. Total Vi range is shown and evidence of lateral and vertical changes in velocity behavior associated with possible lithological or tectonic causes becomes evident.

Method Becvem

Assemble from well and sonic data base using same scale as 2 above, all wells per sequence per selected area, plots of velocity/depth.

Figure 3:
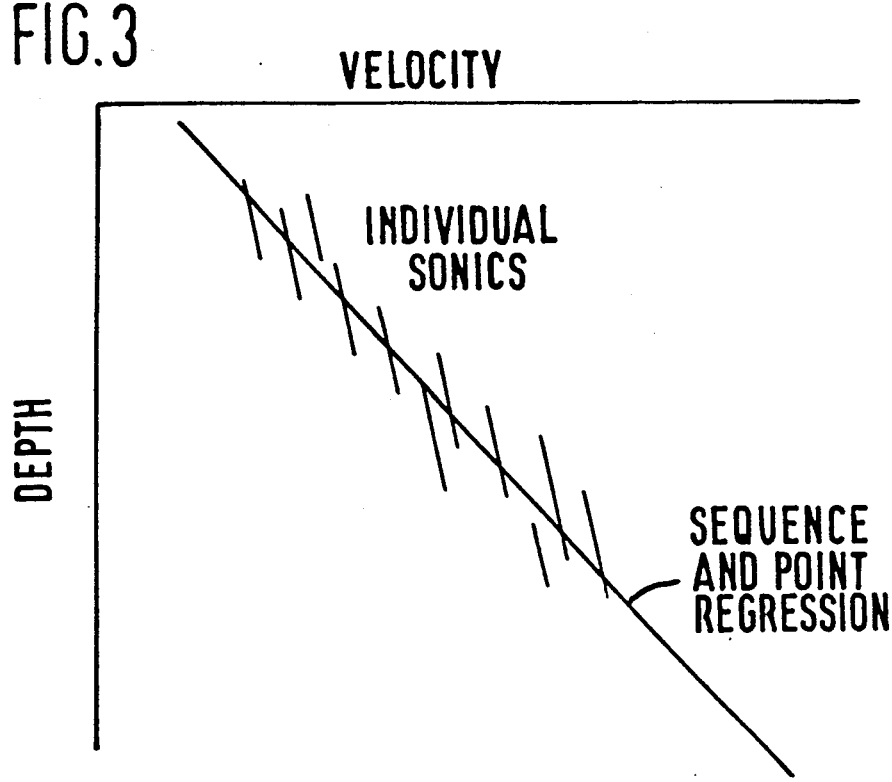
FIG. 3 is a plot of velocity vs. depth for 11 wells and one sequence depicting 2 normalized gradients generated from one data set.

Generate two normalization gradients then compare/contrast, i.e.,
1. Normalization gradient chosen is that most representative of each individual sonic slope per sequence area.
2. Normalization gradient chosen by regression analysis of mid point depth/velocity data, as depicted in FIG. 3.

Note a. If gradients described in 1 and 2 similar, probably simple basin. Continue with confidence. If these gradients are different, use gradient described in 1 and continue with care.

b. Certain finely-interbedded (i.e., thinner than seismic resolution) sequences cannot be easily normalized as interbeds may show >1 (normalized) interval velocity.

Sonic slope normalization requires identification of the mean slope, calculated by linear regression, or better still, by eyeball, of any individual sequence segment or as an average of all sequence segments. This slope is termed "K" and is advantageously chosen to be a straight line when possible. The intercept of this slope with the velocity axis is termed Vo. The normalized interval velocity $Vo = Vi - K$ (sequence midpoint depth) or velocity of origin is interval velocity adjusted with the elevation difference between sequences midpoint depth and surface datum, scaled by the compaction factor.

Seismic Velocity Sequence related seismic derived interval velocities may be generated and mapped as defined within the literature. Generate conventional scattergram of velocity versus depth, recognizing that both may be of limited accuracy, but that large number of data points are available to permit some averaging of errors.

Generate four velocity maps from their data set as follows. Firstly make an interval velocity map involving smoothing as required. Secondly, resample the smoothed values and define a compaction factor per sequence which will allow the fewest contours on its associated normalized velocity map (Vo an element of K1). Thirdly and fourthly make K2 and K3 scaled up an down by ⅓ from K1 and from these generate 2 more normalized velocity maps. The four maps will appear different and some will relate to geology as we come to understand it better than others.

4. Lateral Velocity Variations (i) From seismic time data

Definition of relative thickness and elevation changes between discrete locations of definition may be determined. Seismic stratigraphic information concerning sequence and sequence boundary relationships involving pattern character, frequency, amplitude, continuity may be used to aid understanding. Definition of additional sequences absent on well control.

For Subsequent RVV ANALYSIS

Definition of inversions - shortwave/longwave. Definition of structural history, of amount by which each sequence has been effected—tectonic framework sigma directions with time. Definition of compressive (measured) shortening. Definition of tension (measured) extension. Definition of faulting.

Figure 6:
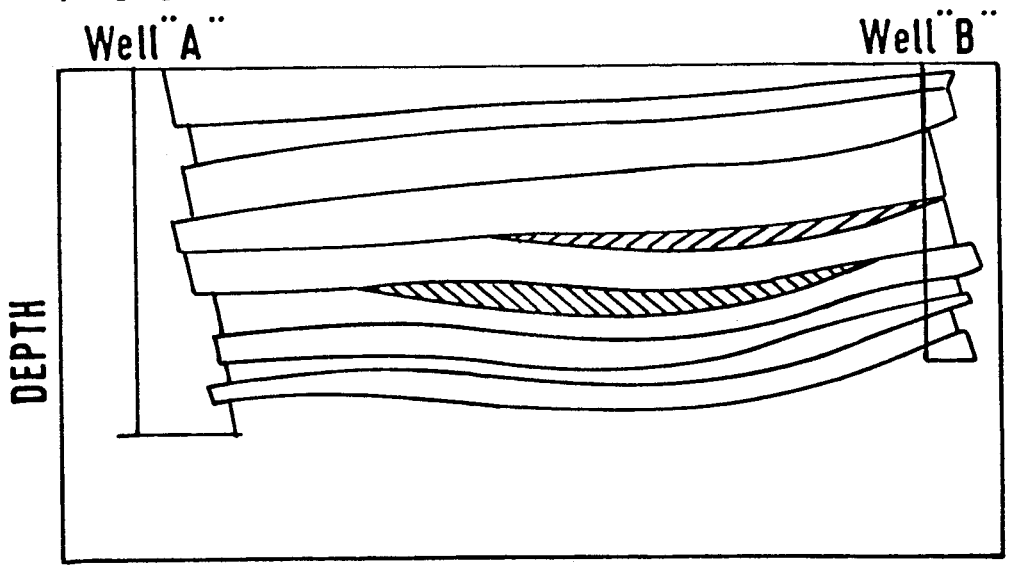
FIG. 6 is a cross-section of distance vs. depth depicting lateral variation in thickness between well control and evidence of sequences not penetrated by well control.
Figure 7:
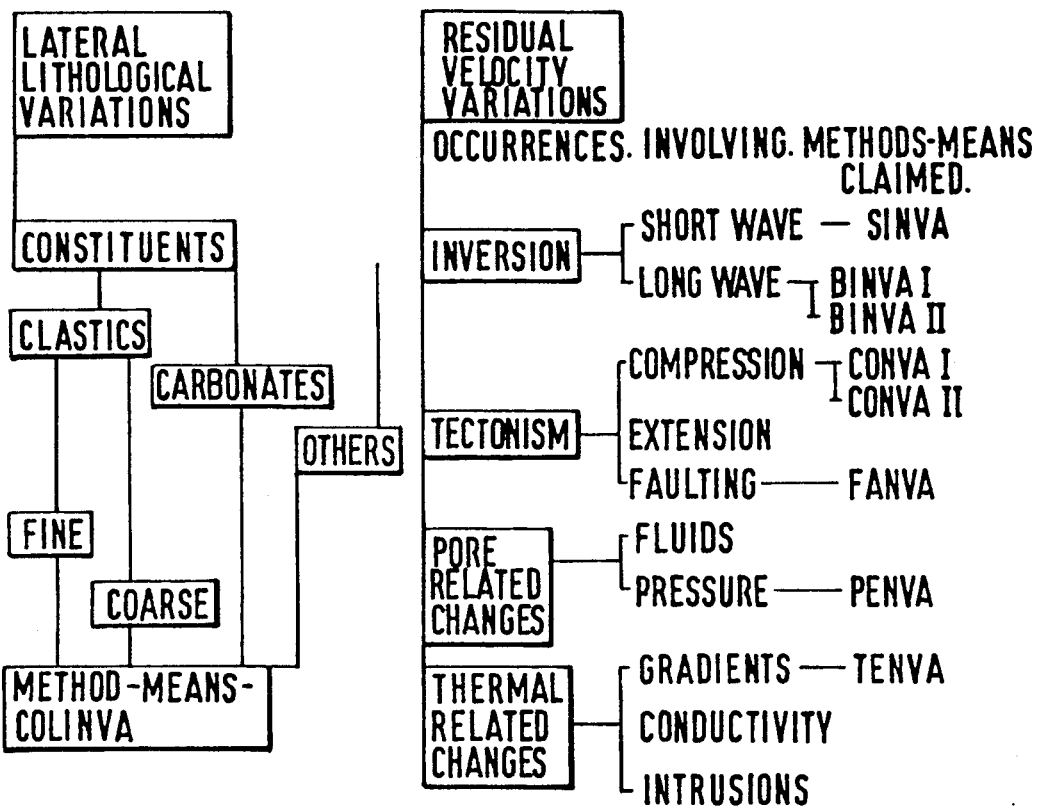
FIG. 7 is a breakdown of the post depositional and depositional factors controlling velocity distribution.
Figure 8:
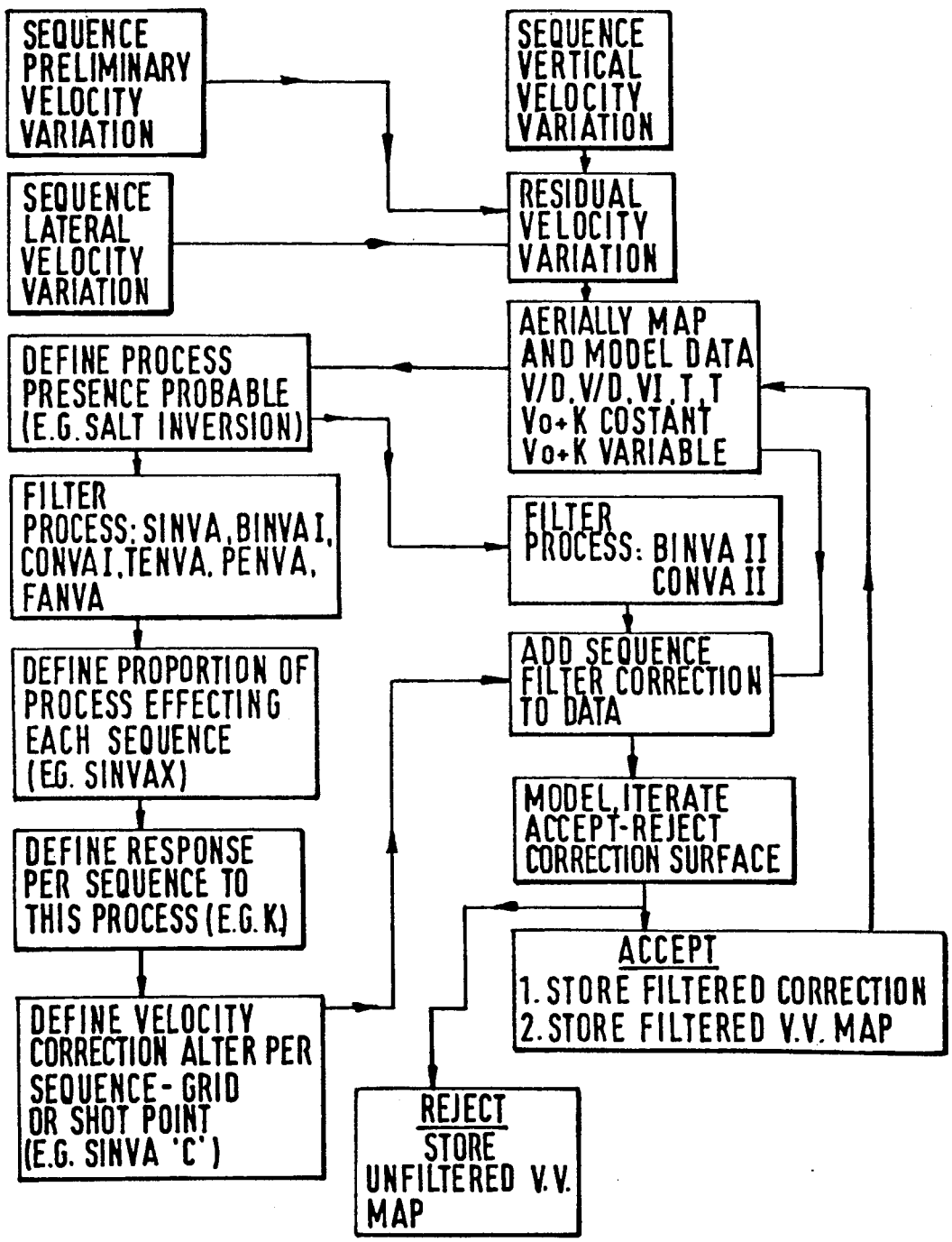
FIG. 8 is a breakdown of the interpretive steps for each post depositional and depositional factor.

FIG. 6 depicts a cross-section of distance versus depth showing lateral variation in thickness between well control and evidence of sequences not penetrated by well control.

(ii) Definition of sequence related interval velocities may be required in the absence of well control.

5. Preliminary Velocity Variation Analysis

In arriving at our preliminary estimate of velocity distribution we have taken logical steps, which involve little extra human work using conventional methods to remove what variables we can, but leaving mapped surfaces combining variables we cannot as yet distinguish.

With or without seismic, we can map at this stage sequence tops/times $\Delta d$, $\Delta t$, Vi, preliminary normalized Vi, with constant K, with variable Vo and locally variable K.

BECVEM (Recap)

We have interpreted as follows:
1. SVV's
well/time/ties
seismic velocity
corrected—valid
picking/smoothing/correction parameters
2. VLV's
Seismic sequences broken vertically to permit detail sufficient for task, and well tops double-checked.
3. VVV's
Normalization analyzed per sequence within the mapped area distribution. Variations related by vague hypothesis to depositional or post depositional process.
4. LVV's Seismic horizon time changes will have been interpreted to an appropriate level accuracy between defined control areas. Iterations 1, 2, and 3 may be made if additional seismic sequences required. Definition of areas suggestive of post depositional processes likely to affect velocities, as indicated by seismic and other geophysical interpretations.
And are now at an intermediate interpretation stage (ideal from which to supply data to partners).

Contained within provisional velocity variation maps are therefore lateral lithological variations, mistakes (if any) and residual velocity variations, as summarized in FIG. 5.

Analytical Procedure (Summary of Steps 1-5 Inclusive)

For each chosen lithologic unit, the segments of well sonic logs, integrated, check shot corrected, and expressed as velocity, is displayed against a cross-plot with axis of Velocity versus Depth, for wells in chosen area. The sequence segments may be resampled or filtered prior to display. The mean slope (calculated by linear regression) of any individual segment or as an average of all segment slopes is termed (k) and is a measure of the change of velocity with depth. This may also be called the compaction factor. The intercept of this slope on the velocity axis is termed Vo, or this normalized velocity [Vo=V1−k (midpoint depth)].

The distribution of segments is believed to be partly the result of physical processes (e.g. uplift, temperature, compression, pressure) and partly the result of lithologic processes (e.g. change in sand/shale ratio).

In accordance with the present invention, the unique and powerful properties of the above analytical technique are: (1) the anomalous wells can be identified; and (2) that compensation factors subsequently derived can be applied and the results quantified.

This procedure differs from the prior art as described, (e.g. Bulat & Stoker 1988). Industry standard technique, sequence mid-point velocity/depth points (per well) made into a Scattergram and one compaction line calculated per mapped area. Of those few exponents of more accurate definitions of compaction (e.g., Mel Carter), none are believed to have generated means and methods to research and define sequence compaction variations, within basic sediments.

6. Residual Velocity Variation

Methods and means are provided to define and correct for the effects of salt and shale inversion, basin inversion, tectonics, temperature, pressure, fluid and faultings, which are distributed anomalously during post-depositional episodes.

Part II

Salt Inversion Normalized Velocity Algorithm (SINVA)

Figure 9:
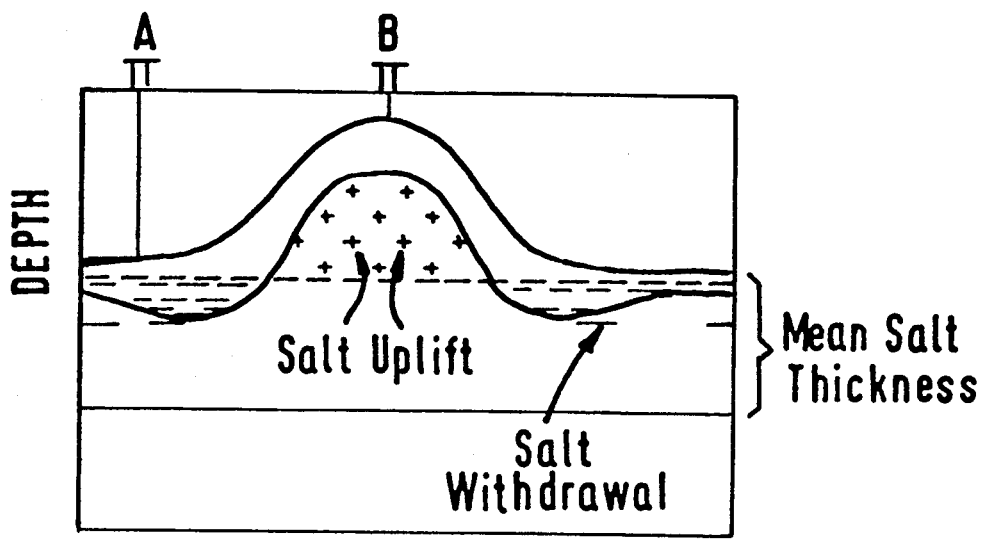
FIG. 9 is a plot of distance vs. depth depicting a sequence affected by salt inversion.
Figure 10:
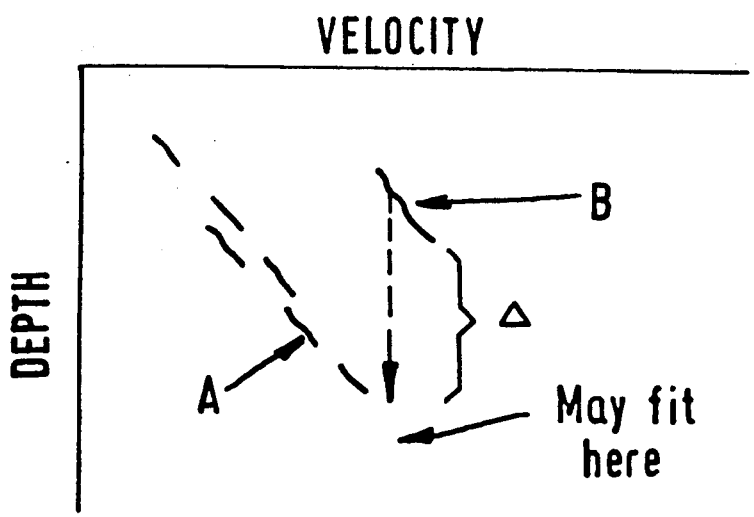
FIG. 10 is a plot of velocity vs. depth of wells "A" and "B" depicted in FIG. 9, with well "B" being inverted.

Use of seismic data to quantify the velocity anomaly due to salt uplift. FIG. 9 depicts a cross-section of distance versus depth showing a sequence affected by salt inversion. Where a lithologic unit has been uplifted as a result of salt movement, the segment will appear anomalously shifted in depth, while the slope (k) may be relatively unaffected, i.e. the compaction relationship of velocity with depth is similar to that of its original depth of burial, at that location (See FIG. 10 depicting a plot of velocity vs. depth of wells "A" and "B").

Procedure to Compensate

A) From seismic interpretation over the whole basin, determine the Isochron (time thickness) of the salt unit. Derive a reliable velocity estimate of the unit and calculate thus the thickness of the salt unit. Calculate the volume of this unit over the whole basin and divide by the area to derive the mean thickness per unit area.

This assumes a net basinal balance of salt input and output, and an original uniformly thick layer of salt and can be adjusted as necessary.

B) Subtract from the measured thickness at any point, the mean thickness to derive a residual map of uplift (positive residuals) Define as SINVA "X" and subsidence (negative residuals). It is assumed that subsidence leads to further compaction, and thus well sonic sequence segments in areas of subsidence will conform to the normal compaction relationship with depth. However wells which have been uplifted will maintain their original compaction characteristics, until burial replaces them below that original environment.

Thus only the positive residuals are used in the Salt Inversion Normalized Velocity Algorithm. (SINVA).

C) The mapped surface calculated as a spatial array or grid of positive residuals (SINVAX) is scaled by the mean slope VVV analysis (k) of the sonic sequence segments as calculated by linear regression, as hereinbefore described in detail in (2), to derive a velocity compensation surface in areas of residual salt uplift (SINVA "C"). SINVA "K" may compare (K) scaled by a proportion of salt movements since each sequence mid point deposition.

D) The Vo velocity intercept derived from all wells is used to create a mapped surface (spatial array or grid) which is then contoured. Anomalous wells may be defined by contour anomalies which stand out from a background trend.

E) The residual salt uplift velocity compensation, as described hereinbefore in "C" as SINVA "C", is subtracted from the Vo values of well segments. In areas of salt uplift, this will tend to suppress the anomaly of Vo as shown on the crossplot. In areas of no salt uplift, no correction is applied.

F) The corrected Vo are then used to create a new mapped surface array (or grid) with contoured anomalies due to salt uplift removed=Normalized Velocity Surface. This represents the theoretical velocity distribution at zero depth in the absence of uplift, and is thus easier to quality control, having fewer reasons for variation present in the contours.

G) The calculated compensation surface (c) is then added back to the Inversion Normalized Velocity Surface (f) such that in the areas of anomalous form well data, the anomaly is preserved. In the areas of no well control (i.e. interwell areas) the predictive quality of the seismic data in identifying uplift, anomalies of Vo will appear which were not previously identifiable, i.e. this method has not only identified the anomaly observed well data, but has predicted the anomalies due to salt uplift in areas of no well control=Inversion Normalized Velocity Surface.

Three additional pitfalls exist which need to be considered in any solution. FIG. 12 depicts a cross-section of distance versus depth for two inversions showing different amounts of post movement deposition.

Firstly, SINVA positive areas may be overlain and further buried by newer sequences after the inversion process locally ceases (See FIG. 12i). To accommodate this, define post-depositional inversion burial as where, in areas of SINVAX, the sequence thickness variations are minimal. This occurs in the area of the sequences where SINVAX maximum grid value for an overly up sequence is approximately equal to the average of SINVAX minimum grid values. Then subtract this sequence thickness value from SINVAX.

Secondly, in SINVA positive areas, sequences may have been deposited during inversion, and to accommodate this, calculate and map sequence thickness variations for all overburden sequences. These variations, summed should be scaled to approximately equal the SINVAX value and then a percentage of SINVAX suffered by each sequence may be available to better calibrate approximate uplift (See FIG. 12, iii-ii=iv).

Thirdly, overlying sequences which may be subjected to salt induced inversion commencing down dip from the zero line defined as SINVAX zero, may still reach a valid SINVAX maximum. If a change of sequence bounding slope from regional to inverted is different (down dip) from the SINVAX zero line for progressively younger sequences, then scale the SINVAX values from maximum (the same) K this new sequences specific SINVAX zero.

H) The Inversion Normalized Velocity Surface (a) is then interpolated on to all seismic control points to be used in depth conversion procedure.

I) Depth conversion at the seismic control points may proceed with a summation of isopachs ("layer cake") according to published expressions, or similar.

Part III

Basin Inversion Normalized Velocity Algorithm (BINVA)

Where a lithologic unit has been uplifted as a result of long wave length basinal uplift, the sequence segment of a sonic log will be anomalously high.

See FIG. 13 depicting a cross-section of distance versus depth indicating sequence thick associated with nan anticline suggesting basin inversion and FIG. 14 depicting a plot of velocity versus depth for the two wells depicted in FIG. 13.

Procedure to Compensate

A) BINVA I

If the original depth of burial of a given sequence can be quantitatively measured by interpretation of a basin, the deviations from it due to basin compression or other uplifting factors (other than salt) can be derived. As with SINVA it is assumed that subsidence or down warping will produce addition velocity increase with depth, while residual uplift will essentially preserve the depth of burial compaction characteristics.

By subtracting the original depth of burial from the measured depth from seismic time data a positive residual map may produce. The uplift amount may also be readily estimated by calculating the lowest closing contour and elevations within an anticline, defined as being associated with a sequence thick. The procedure to derive the velocity compensation factor will then follow the procedure for SINVA, steps C to I, hereinbefore described in detail in Part II.

B) BINVA II

If an accurate measurement of the basinal uplift cannot be made, then an experimental procedure to determine the effect on velocity of uplift must be conducted. This involves the iterative and interactive analysis of the effect of moving an anomalous sonic sequence segment on the Velocity/Depth Crossplot (as hereinbefore described in section 2 above) and observing the result on the Normalized Velocity Contour Map.

Figure 15:
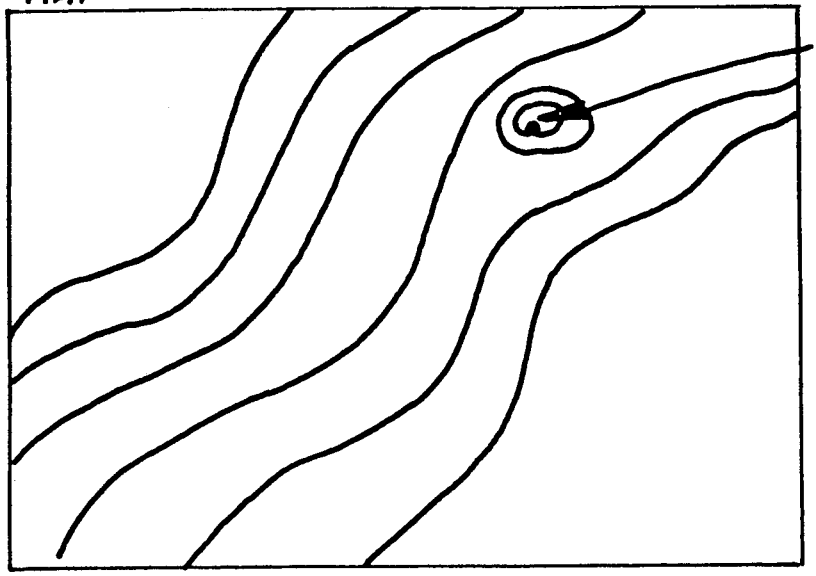
FIG. 15 is a map of provisional velocity contours showing anomaly at well "X."
Figure 16:
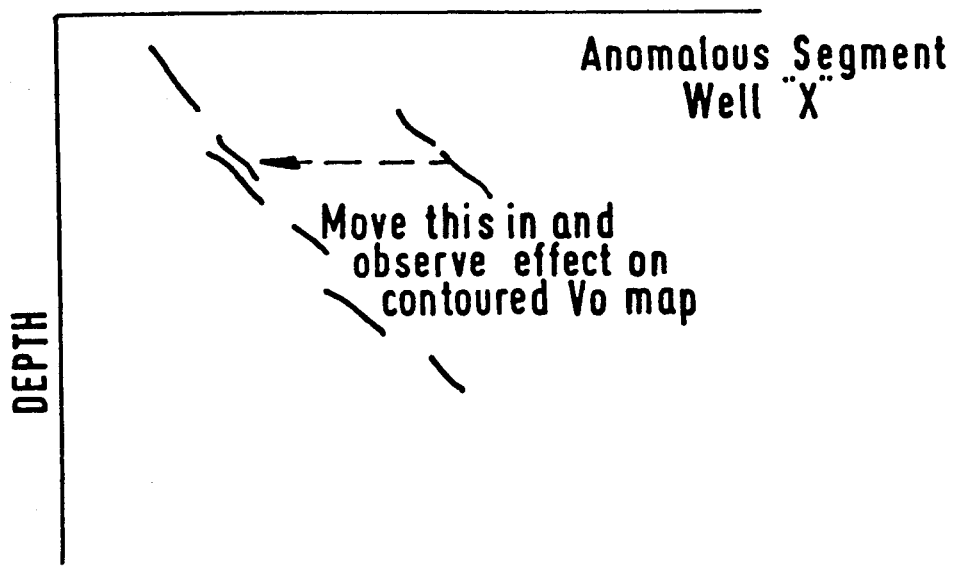
FIG. 16 is a plot of velocity vs. depth of several wells showing an anomaly at well "X."

See FIGS. 15 and 16, depicting a map of provisional velocity contours showing anomaly at well "X", and a plot of velocity vs. depth of several wells showing an anomaly at well "X", respectively.

The result is to obtain an estimate of the uplift above original depth of burial. This information, related to seismic ties, thus provides an estimate of the datum from which a seismically-derived basin-wide compensation factor can be derived and applied, again as described in SINVA steps C to I.

An extra state may be added whereby if the K normalized compaction estimation is discerned as being variable in response to areas apparently inverted, this variation may be iteratively/inter-actively modeled together with the two items previously described.

Part IV

Compression Normalized Velocity Algorithm (CONVA I)

Reduction in pore space by a non-vertical component of stress may both modify locally velocity distribution, and if identified, give an indication of influences bearing on sediments being deposited at that time. Stress fields commonly vary from the general by up to 90° over short distances, depending on local homogeneity. Those sediments which strain while transmitting stress are likely to have imprinted upon them a variation within their velocity distribution, and more than one episode may be represented.

A measure of the varying strain that has occurred through time is present within the seismic interpretation to which the velocity study is being directed. Conventional studies of mapped surfaces, elevations, sequence thicknesses, and fault, anticline and syncline orientations all may be made to aid this interpretation process. Reconstruction methods may be applied and they may identify stress and strain. A new simple method is advocated which utilizes a measure of the varying strain that has occurred through time that is automatically stored in most seismically-mapped data. Section length, versus length of digitized sequence boundary, discounting fault thickness, is itself a measure of strain.

Seismic sequence boundaries are likely not be recorded in direction parallel to maximum or minimum strain, thus it is preferred to analyze accurately made mapped surfaces to determine at specified points the strain amount expressed as a percentage and direction, by calculating direction of greatest and least strain.

Figure 17:
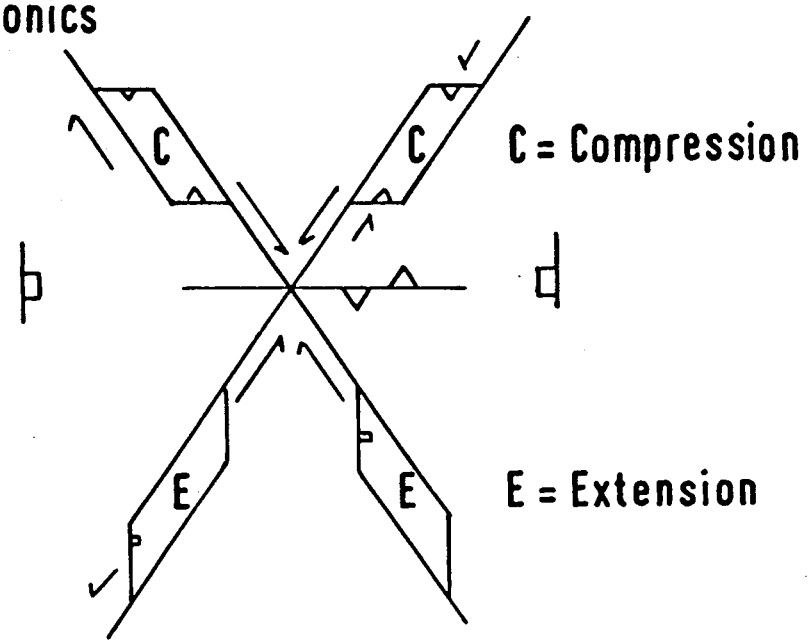
FIG. 17 is a stress vs. strain diagram depicting typical behavior of rocks subjected to a stress field.

A typical published stress strain diagram, valuable in geophysical interpretation and relevant to the need to understand velocity distribution may look like FIG. 17 depicting a stress versus strain diagram showing typical behavior of rocks subjected to a stress field (adapted from Harding, "Petroleum Traps Associated with Wrench Faults" published in *American Association of*

*Petroleum Geologists Bulletin*, vol. 58, pp. 1290-1304, 1974).

1. A map of maximum strain direction (-arrows) at grid points and smoothed contours of equal maximum strain amounts, in percentage terms, may be generated per sequence top. Store values at grid points where strain appears to exceed 100% as a CONVAX, values in %, starting at Zero.
2. Combine with compaction factor K to generate preliminary CONVA "K" map also in %.
3. Compare and contrast this with normalized sequence velocity maps (preferable with SINVA/BINVA values removed if appropriate) i.e., modified RVV map.
4. Generate CONVA "C" correction surfaces by dividing RVV map with CONVA "K" map. Check, if necessary scale, reduce CONVA "K" to acquire adequate fit. This process will tend to reduce velocities in areas where they are likely to have been increased by compression since deposition.
5. Compare and check velocity (depth/velocity sequence plots per sequence), at well control.
6. Accept the correction surface per sequence when it renders control as being geologically more realistic and less anomalous.

Complex basin activity may be an indication of several episodes of stress and strain possibly from varying directions. The latest episode may be most easy to discern in most recent sediments, and this may be expected to influence all earlier sediments through which this stress has been transmitted causing strain. Model the clearest evidence of shorting scaled to a correction percentage for velocity, and match this correction to earlier sequence velocity maps.

As with SINVA and BINVA, note that the corrections will be related through compaction factor and that a sediment with a low k will vary less with shortening than those with a higher k. Anisotrophy and increase of K may be related to influence of compression.

Compression Normalized Velocity Algorithm (CONVA) II

The effect of tectonic horizontal compression affects velocity of the sediments. The exact relationship of compression to velocity is not easy to define. Compressional forces may act over the whole basin and be locally restricted as in pressure ridges associated with wrench faults.

A) Using the analytical cross plot (described in Part III herein) with effects of salt and Basin Inversion removed (described in Parts III and IV herein), residual anomalies may appear thus, and referral is advised to Vo normalized velocity maps to see if mapped aerial distribution is random.

Figure 18:
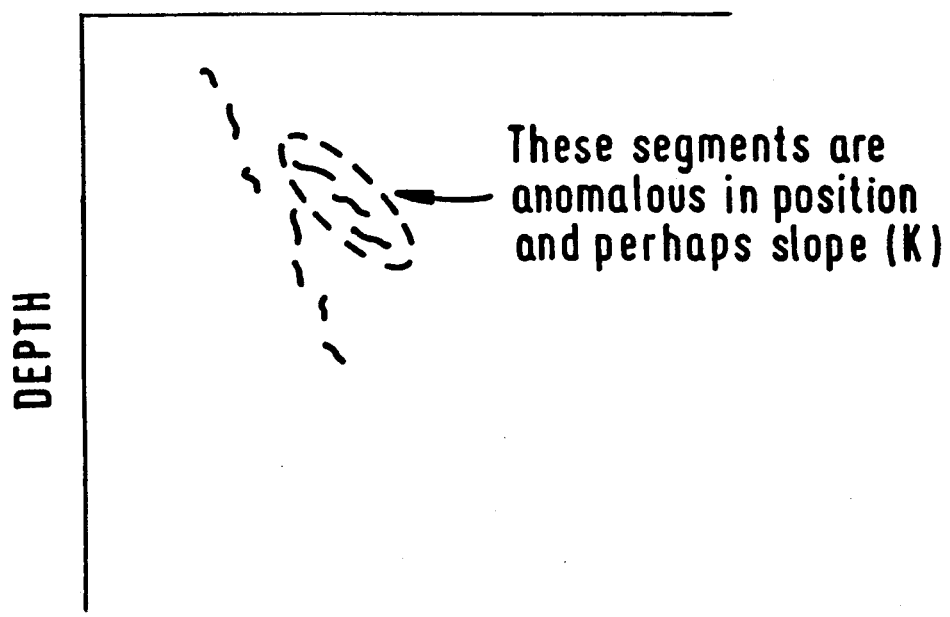
FIG. 18 is a plot of velocity vs. depth showing anomalous compaction (K) factors.

FIG. 18 depicts a plot of velocity versus depth showing anomalous compaction factors.

B) To determine a relationship of compression and velocity a group of similar but anomalous wells, as defined by CONVA analysis of seismic sequence mapped data, is scrutinized to find evidence of repeat section through reverse faulting. Similarly the seismic data through these wells is subjected to 2-Dimensional or 3-Dimensional palinspastic reconstruction. Section balancing and interpreted digitized seismic may permit allocation of values per location point, per sequence of shorting, or extension.

C) If a relationship of velocity anomaly and sequence shortening can be established, this is used as a scale factor to derive a compensation surface from seismic and well data to be applied to the well data at well locations. Responses of most common lithology types to a change in physical circumstances has an effect upon its velocity/depth relationship, as hereinbefore defined. If compression increases $V_i$ and $V_o$ by a scaled percentage the net effect apparent may be of increased $V_i$, and stronger (larger) k, and often similar or reduced $V_o$.

D) The Value of Vo and possible "k" compensation at the well locations is subtracted (RVV/CONVA "K" provides the value to subtract) to reduce the observed anomaly on the corssplot. The Normalized Velocity Surface, compensated for compressional effects is regenerated from well data.

E) The compressional compensation surface is then added back to tie the wells at well locations but also to add compensations to the Normalized Velocity surface as derived and predicted from seismic data in the interwell zone.

Part V
(Temperature Normalized Velocity Algorithm) (TENVA)

Temperature difference is related to velocity difference and is related to porosity difference, by published relationships.

1. Define relationship per sequence per basin.
2. TENVA Cw=correction per sequence per well map.
3. TENVA Cs=correction per sequence aerially if can TENVA Cw to basement morphology as seen in seismic mapping, i.e., temperature is related to total overburden thickness map.
4. TENVA Cas=correction addition to scale to proximity of mapped salt thicks/highs—since salt is highly conductive.

Thermal influences on the velocity distribution of a sequence are related to the k value of that sequence, and may be estimated as follows:

Map Thermal gradients from well control as required adjust by:
  i) Approximate sequence isopachs, layering up from basement, scaled with insulation factor, summed upwards to reach sequence in question, where k value stored.
  ii) Geochemical and inversion information suggesting earlier episodes and amounts of higher temperature.
  iii) Gravity/magnetic information, identify age and presence of intrusives (underlying shallow dikes/sills) which may correlate closely with seismic velocity anomalies.
  iv) Lineaments of identified basement involved faulting.

If possible computer generate simple surfaces using loose grids to illustrate and sum, each possible contribution to variation in the thermal gradient. The (adjusted) thermal gradient map sealed per sequence by the appropriate k value is adjusted using published relationships to equate to expected alteration in velocity distribution. (Note - the objective here is to identify, understand and spatially remove significant pitfalls, not to research for an obscure PHD).

Three data sets are available for use in interactive modeling:
1. Pre Tenva Vo variable normalized Vi maps
2. Pre Tenva velocity/depth plots.

Both data sets 1 and 2 will have had SINVA, BINVA and CONVA filters applied to remove appropriate effects.

3. (Adjusted) Thermal gradient Sequence Velocity map variation.

Anomalies visible on data control points in data set 3 may be removed, and this will have the effect of moving data at the equivalent control points on data sets 1 and 2. If, for example, a hot anomaly on data set 3 is noted as having caused a positive variation in sequence velocity, and this is found to correlate with fast trends in data sets 1 and 2, then it may be adjusted out, and the adjustment stored as part of the Tenva correction surface which may be extended over the interpretation area.

The objective is to group the most natural effect of this (Thermal) family of factors in one (TENVA) filter system. The probability is that little effect will be found.

PART VI

Pressure Normalized Velocity Algorithm (PENVA)

i) Define and map sequences where wells show variation in pressure.
ii) Define and map sequences where seismic suggests overpressuring.
iii) Define and map sequences where seismic velocities suggest overpressuring.

Normal gradients relate well to compaction factors (or defined VUV). Occasionally a sequence may be fault or dyke or permeability divided into two pressure regimes, one normal, and one abnormal, in which case only the abnormal need be defined and corrected for.

Where significant sequence velocity variations occur it may be that pore pressure is sufficient to flow an undercompacted sediment (e.g., shale), and thus the velocity is related to the fluid rather than the matrix material. A correction surface based upon wells and seismic may be generated, with a rapid generation between over pressured and normal parts of a sequence.

Where such flowage occurs, density variation may cause diapirism, in which case local inversions may be dealt with by an adaption of the SINVA program, as hereinbefore described in detail.

Different lithologies have a different velocity response to variation in pressure thus individual sequences each require a unique "k" definition, which largely removes from velocity mapping the effects of pressure.

Variations in pressure systems can cause subtle velocity variations in some sequences, depending on k. Removal by a filter correction can be achieved. Proceed sequentially, as described in Part IV hereof, with modeling of three interactive elements (pressure map, from (i), (ii) and (iii) above/velocity map/velocity-depth plots with the later two having had removed all possible residuals (first).

PART VII

Fault Normalized Velocity Algorithm (FANVA)

Where relationships between faulting, velocity anomalies and lithologies are unclear, the following process is suggested.
1. Withdraw mapped sequence fault area polygons (hanging/foot wall trace with sequence boundary) with throws. Contour 5x, 10x, 20x fault throw as contours outwards in an horizontal plane.
2. Withdraw mapped sequence Vo maps filtered with previously described RVV techniques.
3. Model relationship per sequence, define and remove, by observation to determine if velocity control points are fault adjacent, and consistently relatable to contours. If appropriate, convert contour values to correction factor and store.

7. Lateral Lithological Variation

At this stage, numerous factors which were effecting the overburden velocity field of basin sediments should have been removed by the systematic methods and means previously described. Of the factors which are developed by post-depositional activity, most should have been removed. Of these factors which are developed by activity during deposition, some should have been removed; namely these associated with the subdividing of the basin into units, or seismically discernable sequence of like material.

That which is left is therefore largely influenced by activity during deposition which is seismically not discernable at the level of required interpretation. It will include minor vertical variations beyond seismic resolution which otherwise may be removed by picking another sequence, and lateral changes in sedimentation involving minerals, grain morphology and cementation.

If errors in the previous stages occur then they will appear as anomalies here, which may be checked against real well data. If the anomaly does not match the real data, we shall return to earlier stages to determine and correct the source of the error.

Figure 19:
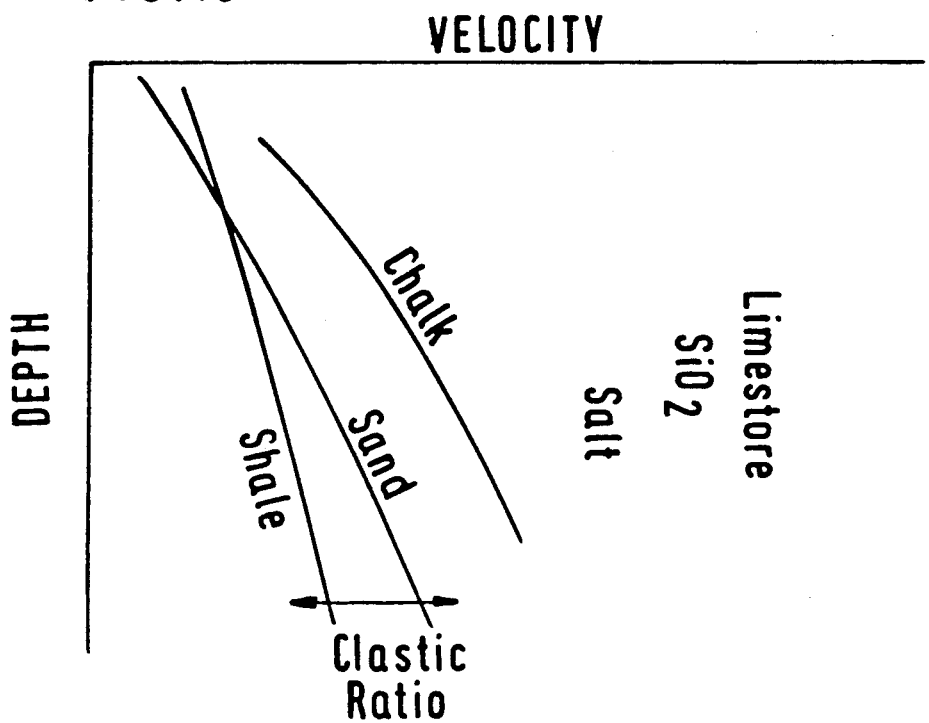
FIG. 19 is a plot of velocity vs. depth plot for common lithologies.

To quickly control the LLV maps against well data, we need some plots expressing the known variations at scales equivalent to an LLV data. The known data from well control may be sand-to-shale ratio, or a relationship involving carbonates and clastics. FIG. 19 amended from Gardner shows how velocities of different depth may be related through component ratios in a particular basin.

Figure 20:
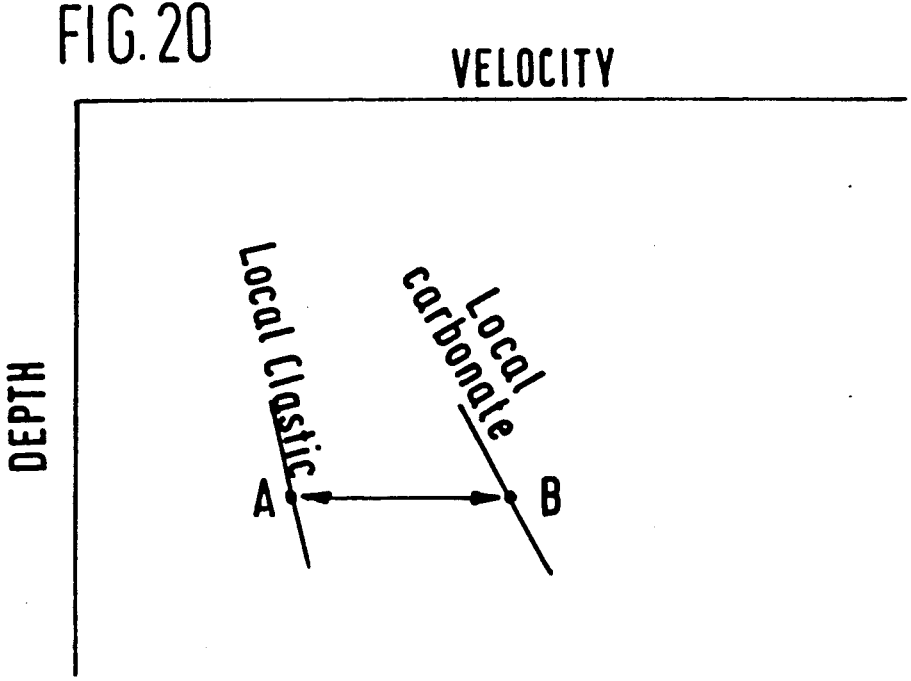
FIG. 20 is a plot of velocity vs. depth plot for a sequence of mixed lithologies.

If the clastic component is determined at wells, for example by use of sand/shale ratios, we can determine its probable velocity behavior as point A (on FIG. 19). If its carbonate component is determined, that too may allow estimation of velocity behavior as point B (on FIG. 20). If carbonate/clastic proportions are extracted, they can be entered as a point C (on FIG. 20) proportionally between points A and B.

While this stage is not considered a uniquely new step, it is, however, now validated and made industrially more useful by the fact that contaminants to determination of depositional state, caused by post-depositional circumstances have been estimated and removed.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to be measured by the scope of the appended claims herein.

What is claimed is:

1. In an environment encompassing sedimentary rocks disposed insitu in subsurface sequences, from which conventional well log data, including sonic data, has been obtained downhole, and from which seismic time sections and velocity spectra at discrete locations have been conventionally obtained, a method of evaluating velocity distributions and interpreting the depositional and post depositional causes therefor, comprising:

selecting lithological units from said seismic sequences and well log data to provide interval velocities therefor;

inverting said sonic well log data to obtain velocities therefor;

plotting velocity versus depth for said well sonic data;

determining compaction factor by calculating the mean slope of all individual sonic data segments;

determining preliminary normalized interval velocity with constant average compaction factor by calculating an average of the slopes for all of said segments for each well segment penetrating each said sequence;

mapping compaction variation per sequence per sequence to determine the affect of lateral compaction variation upon velocity distribution;

ascertaining functional relationship between a plurality of said post deposition physical processes and the velocity distribution depicted in said maps and said plots, by classifying the characteristics of said processes against the response of each of said sequences thereto;

generating a sequence velocity correction surface for each said process showing said relationship; and removing said sequence velocity correction surface from said maps and said plots.

2. In a basin environment encompassing sedimentary rocks disposed insitu in subsurface sequences, from which conventional well log data, including sonic data, has been obtained downhole, and from which seismic time sections and velocity spectra at discrete locations have been conventionally obtained, a method of evaluating velocity distributions and interpreting the depositional and post depositional causes therefor, comprising:

selecting lithological units from said seismic sequences and well log data to provide interval velocities therefor;

inverting said sonic well log data to obtain velocities therefor;

plotting velocity versus depth for said well sonic data;

determining compaction factor by calculating the mean slope of all individual sonic data segments;

determining preliminary normalized interval velocity with constant average compaction factor by calculating an average of the slopes for all of said segments for each well segment penetrating each said sequence;

mapping compaction variation per sequence to determine the affect of lateral compaction variation upon velocity distribution;

ascertaining a functional relationship between a short wave inversion, such as a salt diapir or swell, and the velocity distribution depicted in said maps and said plots, by calculating from the area and volume of said salt in said basin the average thickness and at any location therein a plurality of local thickness derived from seismic mapping;

identifying locations and amounts of salt uplift subtracting said average thickness from said plurality of local thicknesses, said locations of said salt uplift corresponding to positive differences thereof;

spatially storing the product of compaction factor and the proportion of salt movement since sequence midpoint deposition;

generating a sequence velocity correction surface covering said plurality of locations;

subtracting said sequence velocity correction surface from said maps and said plot to obtain normalized velocity maps unaffected by said short wave inversions; and adding said sequence velocity correction surface to said normalized velocity maps to obtain a depth conversion unaffected by said short wave inversions.

3. In a basin environment encompassing sedimentary rocks disposed insitu in subsurface sequences, from which conventional well log data, including sonic data, has been obtained downhole, and from which seismic time sections and velocity spectra at discrete locations have been conventionally obtained, a method of evaluating velocity distributions and interpreting the depositional and post depositional causes therefor, comprising:

selecting lithological units from said seismic sequences and well log data to provide interval velocities therefor;

inverting said sonic well log data to obtain velocities therefor;

plotting velocity versus depth for said well sonic data;

determining compaction factor by calculating the mean slope of all individual sonic data segments;

determining preliminary normalized interval velocity with constant average compaction factor by calculating an average of the slopes for all of said segments for each well segment penetrating each said sequence;

mapping compaction variation per sequence to determine the affect of lateral compaction variation upon velocity distribution;

ascertaining a functional relationship between a long wave inversion, such as basin inversion, and the velocity distribution depicted in said maps and said plots;

defining the areas of said basin the sequence thickens in association with an anticlinal trend;

estimating inversion at a plurality of locations by using the relief of said anticlines;

spatially storing the product of compaction factor and the said amount of long wave inversion since sequence midpoint deposition;

generating a sequence velocity correction surface covering said plurality of locations;

subtracting said sequence velocity correction surface from said maps and said plot to obtain normalized velocity maps unaffected by said long wave inversions; and adding said sequence velocity correction surface to said normalized velocity maps to obtain a depth conversion unaffected by said long wave inversions.

4. In a basin environment encompassing sedimentary rocks disposed insitu in subsurface sequences, from which conventional well log data, including sonic data, has been obtained downhole, and from which seismic time sections and velocity spectra at discrete locations have been conventionally obtained, a method of evaluating velocity distributions and interpreting the depositional and post depositional causes therefor, comprising:

selecting lithological units from said seismic sequences and well log data to provide interval velocities therefor;

inverting said sonic well log data to obtain velocities therefor;

plotting velocity versus depth for said well sonic data;

determining compaction factor by calculating the mean slope of all individual sonic data segments;

determining preliminary normalized interval velocity with constant average compaction factor by calculating an average of the slopes for all of said segments for each well segment penetrating each said sequence;

mapping compaction variation per sequence to determine the affect of lateral compaction variation upon velocity distribution;

ascertaining a functional relationship between a tectonic episode involving compression or extension, and the velocity distribution depicted in said maps and said plots;

defining the areas of said basin where sequences show estimable shortening or extension using seismic horizon data;

generating maps of said compression and said extension by calculating a plurality of ratios of straight line distances between a plurality of corresponding pairs of points to unfaulted horizon length; estimating stress directions and strain amounts;

generating a sequence velocity correction surface for each said tectonic episode showing said relationship; and removing said sequence velocity correction surface from said maps and said plots.

5. In a basin environment encompasing sedimentary rocks disposed insitu in subsurface sequences, from which conventional well log data, including sonic data, has been obtained downhole, and from which seismic time sections and velocity spectra at discrete locations have been conventionally obtained, a method of evaluating velocity distributions and interpreting the depositional and post depositional causes therefor, comprising:

selecting lithological units from said seismic sequences and well log data to provide interval velocities therefor;

inverting said sonic well log data to obtain velocities therefor;

plotting velocity versus depth for said well sonic data;

determining compaction factor by calculating the mean slope of all individual sonic data segments;

determining preliminary normalized interval velocity with constant average compaction factor by calculating an average of the slopes for all of said segments for each well segment penetrating each said sequence;

mapping compaction variation per sequence to determine the affect of lateral compaction variation upon velocity distribution;

ascertaining a functional relationship between a post depositional episode involving changes in pore pressure, and the velocity distribution depicted in said maps and said plots;

defining a first plurality of areas where sequences show an overpressuring effect using normalized velocities;

further defining a second plurality of area where seismic interpretations show an apparent overpressuring effect;

generating a sequence velocity correction surface for each said post depositional episode showing said relationship; and removing said sequence velocity correction surface from said maps and said plots.

6. In a basin environment encompassing sedimentary rocks disposed insitu in subsurface sequences, from which conventional well log data, including sonic data, has been obtained downhole, and from which seismic time sections and velocity spectra at discrete locations have been conventionally obtained, a method of evaluating velocity distributions and interpreting the depositional and post depositional causes therefor, comprising:

selecting lithological units from said seismic sequences and well log data to provide interval velocities therefor;

inverting said sonic well log data to obtain velocities therefor;

plotting velocity versus depth for said well sonic data;

determining compaction factor by calculating the mean slope of all individual sonic data segments;

determining preliminary normalized interval velocity with constant average compaction factor by calculating an average of the slopes for all of said segments for each well segment penetrating each said sequence;

mapping compaction variation per sequence to determine the affect of lateral compaction variation upon velocity distribution;

ascertaining a functional relationship between a tectonic process involving faulting, and the velocity distribution depicted in said maps and said plots;

defining mapped sequence fault area polygons having hanging and foot wall positions and throws with added contours related spatially from said polygons at distances which are multiples of said fault throws;

coordinating said tectonic process map with said maps and said plots depicting velocity distribution to develop a sequence velocity correction surface; and removing said sequence velocity correction surface from said maps and said plots.

* * * * *